(12) United States Patent
Pignatelli et al.

(10) Patent No.: US 10,169,289 B2
(45) Date of Patent: Jan. 1, 2019

(54) MEMORY SYSTEM AND METHOD FOR ACCELERATING BOOT TIME

(71) Applicant: SK hynix Inc., Gyeonggi-do OT (KR)

(72) Inventors: David Pignatelli, Saratoga, CA (US); Johnny Lam, Fredrick, CO (US); Michael S. Allison, Longmont, CO (US)

(73) Assignee: SK Hynix Inc., Gyeonggi-do (KR)

( * ) Notice: Subject to any disclaimer, the term of this patent is extended or adjusted under 35 U.S.C. 154(b) by 72 days.

(21) Appl. No.: 15/633,275

(22) Filed: Jun. 26, 2017

(65) Prior Publication Data
US 2017/0371834 A1    Dec. 28, 2017

Related U.S. Application Data

(60) Provisional application No. 62/354,501, filed on Jun. 24, 2016.

(51) Int. Cl.
| | |
|---|---|
| *G06F 15/177* | (2006.01) |
| *G06F 12/00* | (2006.01) |
| *G06F 9/4401* | (2018.01) |
| *G06F 8/61* | (2018.01) |

(52) U.S. Cl.
CPC ......... *G06F 15/177* (2013.01); *G06F 9/441* (2013.01); *G06F 8/63* (2013.01); *G06F 12/00* (2013.01)

(58) Field of Classification Search
CPC .......... G06F 15/177; G06F 9/441; G06F 8/63; G06F 12/00
See application file for complete search history.

(56) References Cited

U.S. PATENT DOCUMENTS

| | | | |
|---|---|---|---|
| 9,229,730 B2 | 1/2016 | Amann et al. | |
| 2009/0228634 A1* | 9/2009 | Nakamura | G06F 11/1068 711/103 |
| 2013/0159601 A1* | 6/2013 | Lassa | G11C 29/883 711/103 |
| 2014/0019741 A1* | 1/2014 | Nautiyal | G06F 9/4408 713/2 |
| 2014/0331033 A1* | 11/2014 | Liang | G06F 12/00 713/1 |
| 2015/0261613 A1* | 9/2015 | Tuers | G06F 9/4401 713/2 |

* cited by examiner

*Primary Examiner* — Jaweed A Abbaszadeh
*Assistant Examiner* — Gayathri Sampath
(74) *Attorney, Agent, or Firm* — IP & T Group LLP

(57) ABSTRACT

A memory system includes a plurality of memory channels, each of the plurality of memory channels includes a plurality of memory dies and a die processor, each of the plurality of memory dies includes a plurality of memory blocks; and a memory controller including a monarch processor, coupled to the plurality of memory channels, wherein the die processor on each of the plurality of memory channels is configured in parallel to process to find last written data within at least a predetermined block of the plurality of memory dies; and provide information regarding the last written data to the monarch processor, the monarch processor determines which boot record to be used to identify firmware images based on the information.

18 Claims, 6 Drawing Sheets

MEMORY SYSTEM AND METHOD FOR ACCELERATING BOOT TIME

CROSS-REFERENCES TO RELATED APPLICATIONS

This application claims the benefit of U.S. Provisional Application No. 62/354,501 filed Jun. 24, 2016, the entire contents of which are incorporated herein by reference.

BACKGROUND

Field of Invention

Exemplary embodiments of the present disclosure relate to a memory system and an operating method thereof.

Description of Related Arts

The computer environment paradigm has shifted to ubiquitous computing systems that can be used anytime and anywhere. Due to this fact, the use of portable electronic devices such as mobile phones, digital cameras, and notebook computers has rapidly increased. These portable electronic devices generally use a memory system having memory devices, such as a data storage device. The data storage device is used as a main memory device or an auxiliary memory device of the portable electronic devices.

Data storage devices using the memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

The SSD can include flash memory components and a SSD controller. The SSD controller can be also referred as a processor, which includes the electronics that bridge the flash memory components to the SSD input/output (I/O) interfaces.

Thus, there remains a need for a memory system and operating method thereof for accelerating or reducing boot time of the memory system such as the SSD.

SUMMARY

Embodiments of the present disclosure are directed to a memory system and an operating method thereof capable of accelerating or reducing boot time of the memory system.

A memory system may include: a plurality of memory channels, each of the plurality of memory channels includes a plurality of memory dies and a die processor, each of the plurality of memory dies includes a plurality of memory blocks; and a memory controller including a monarch processor, coupled to the plurality of memory channels, wherein the die processor on each of the plurality of memory channels is configured in parallel to: process to find last written data within at least a predetermined block of the plurality of memory dies; and provide information regarding the last written data to the monarch processor, the monarch processor determines which boot record to be used to identify firmware images based on the information.

An operating method of a memory system may include: providing a plurality of memory channels and a memory controller including a monarch processor, coupled to the plurality of memory channels, each of the plurality of memory channels includes a plurality of memory dies and a die processor, each of the plurality of memory dies includes a plurality of memory blocks; by the die processors on the plurality of memory channels, in parallel, processing to find last written data within at least a predetermined block of the plurality of memory dies, and providing information regarding the last written data to the monarch processor; and by the monarch processor, determining which boot record to be used to identify firmware images based on the information.

A memory system may include: a memory device including a plurality of memory dies and a die processor, each of the plurality of memory dies including a plurality of memory blocks, and a memory controller including a monarch processor, coupled to the memory device. The die processor is configured to process to find the last written data within at least a predetermined block of the plurality of memory dies, and provide information regarding the last written data to the monarch processor such that the monarch processor determines which boot record to be used to identify firmware images based on the information.

BRIEF DESCRIPTION OF THE DRAWINGS

The above and other features and advantages of the present invention will become more apparent to those skilled in the art to which the present invention pertains by the following detailed description with reference to the attached drawings in which.

DETAILED DESCRIPTION

Figure 1:
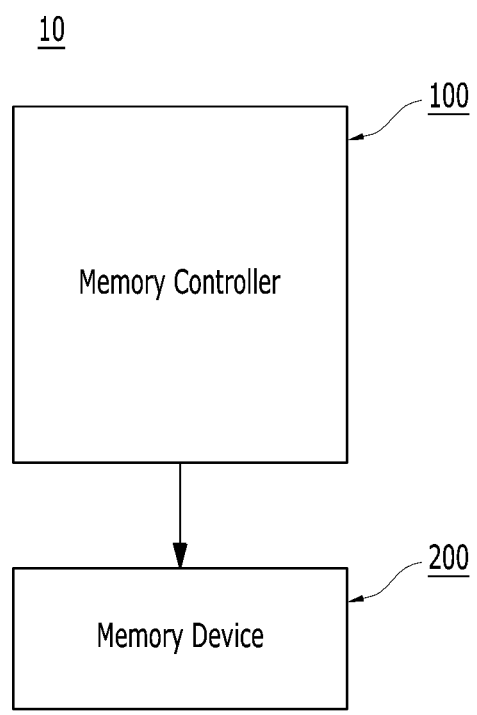
FIG. 1 is a top-level block diagram schematically illustrating a memory system in accordance with an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

FIG. 1 is a top-level block diagram schematically illustrating a memory system in accordance with an embodiment of the present invention.

Referring FIG. 1, the memory system 10 may include a memory controller 100 and a memory device 200. The memory controller 100 may control overall operations of the memory device 200.

The memory device 200 may perform one or more erase, program, and read operations under the control of the memory controller 100. The memory device 200 may receive a command CMD, an address ADDR and data through input/output lines. The memory device 200 may receive power PWR through a power line and a control signal CTRL through a control line. The control signal may include a command latch enable (CLE) signal, an address latch enable (ALE) signal, a chip enable (CE) signal, a write enable (WE) signal, a read enable (RE) signal, and so on.

The memory controller 100 and the memory device 200 may be integrated in a single semiconductor device. For example, the memory controller 100 and the memory device 200 may be integrated in a single semiconductor device such as a SSD. The SSD may include a storage device for storing data therein. When the memory system 10 is used in an SSD, operation speed of a host (not shown) coupled to the memory system 10 may remarkably improve.

The memory controller 100 and the memory device 200 may be integrated in a single semiconductor device such as a memory card. For example, the memory controller 100 and the memory device 200 may be integrated in a single semiconductor device to configure a memory card such as a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (micro MMC), a secure digital (SD) card, a mini secure digital (mini SD) card, a micro secure digital (micro SD) card, a secure digital high capacity (SDHC), and a universal flash storage (UFS).

For another example, the memory system 10 may be provided as one of various elements including an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data centre, a device capable of receiving and transmitting information in a wireless environment, one of electronic devices of a home network, one of electronic devices of a computer network, one of electronic devices of a telematics network, a radio-frequency identification (RFID) device, or elements devices of a computing system.

Figure 2:
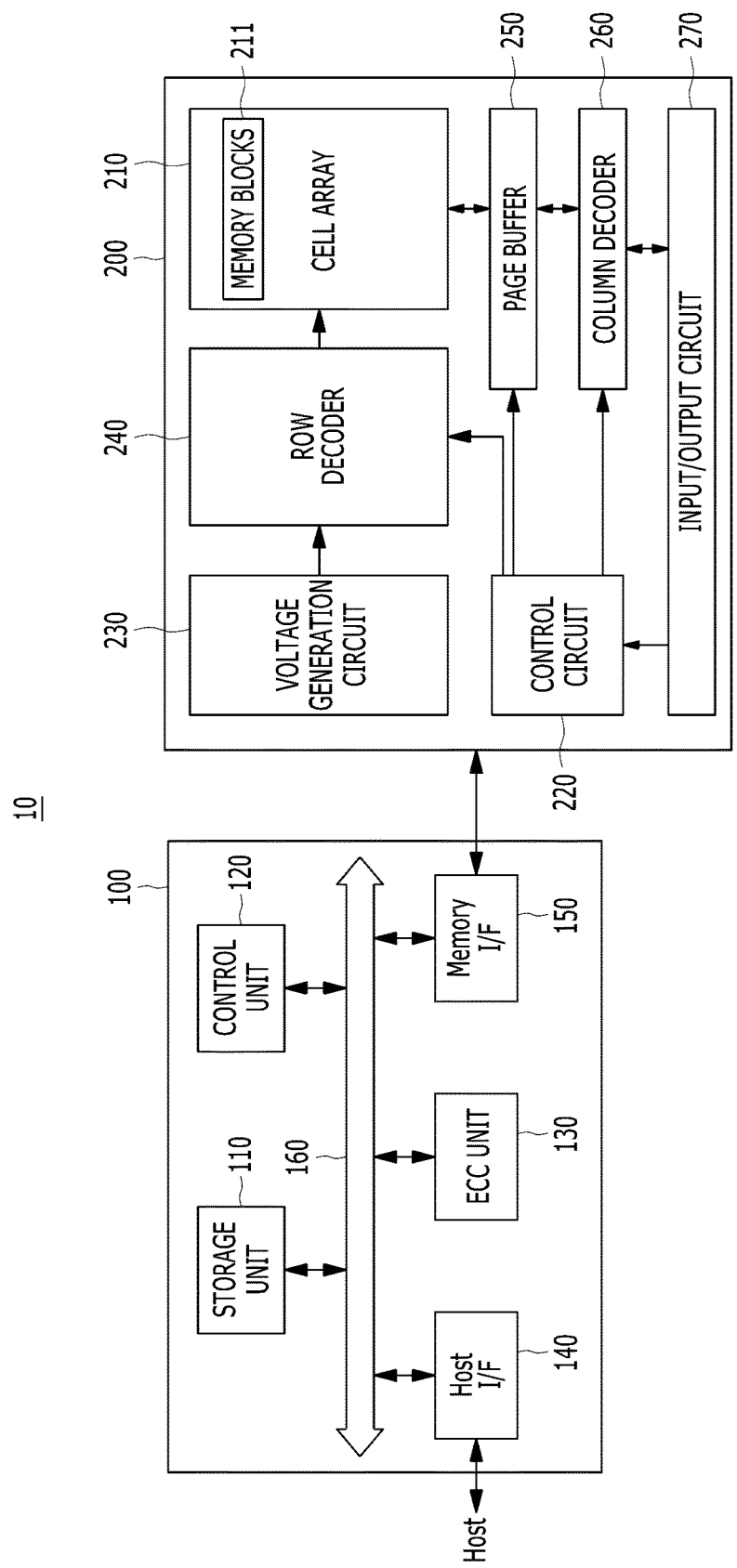
FIG. 2 is a detailed block diagram illustrating a memory system in accordance with an embodiment of the present invention.

FIG. 2 is a detailed block diagram illustrating a memory system in accordance with an embodiment of the present invention. For example, the memory system of FIG. 2 may depict the memory system 10 shown in FIG. 1.

Referring to FIG. 2, the memory system 10 may include the memory controller 100 and the memory device 200. The memory system 10 may operate in response to a request from a host device, and in particular, store data to be accessed by the host device.

The host device may be implemented with any one of various kinds of electronic devices. In some embodiments, the host device may include an electronic device such as a desktop computer, a workstation, a three-dimensional (3D) television, a smart television, a digital audio recorder, a digital audio player, a digital picture recorder, a digital picture player, a digital video recorder and a digital video player. In some embodiments, the host device may include a portable electronic device such as a mobile phone, a smart phone, an e-book, an MP3 player, a portable multimedia player (PMP), and a portable game player.

The memory device 200 may store data to be accessed by the host device.

The memory device 200 may be implemented with a volatile memory device such as a dynamic random access memory (DRAM) and a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magneto-resistive RAM (MRAM) and a resistive RAM (RRAM).

The memory controller 100 may control storage of data in the memory device 200. For example, the memory controller 100 may control the memory device 200 in response to a request from the host device. The memory controller 100 may provide the data read from the memory device 200, to the host device, and store the data provided from the host device into the memory device 200.

The memory controller 100 may include a storage unit 110, a control unit 120, the error correction code (ECC) unit 130, a host interface 140 and a memory interface 150, which are coupled through a bus 160.

The storage unit 110 may serve as a working memory of the memory system 10 and the memory controller 100, and store data for driving the memory system 10 and the memory controller 100. When the memory controller 100 controls operations of the memory device 200, the storage unit 110 may store data used by the memory controller 100 and the memory device 200 for such operations as read, write, program and erase operations.

The storage unit 110 may be implemented with a volatile memory. The storage unit 110 may be implemented with a static random access memory (SRAM) or a dynamic random access memory (DRAM). As described above, the storage unit 110 may store data used by the host device in the memory device 200 for the read and write operations. To store the data, the storage unit 110 may include a program memory, a data memory, a write buffer, a read buffer, a map buffer, and so forth.

The control unit 120 may control general operations of the memory system 10, and a write operation or a read operation for the memory device 200, in response to a write request or a read request from the host device. The control unit 120 may drive firmware, which is referred to as a flash translation layer (FTL), to control the general operations of the memory system 10. For example, the FTL may perform operations such as logical to physical (L2P) mapping, wear leveling, garbage collection, and bad block handling.

The ECC unit 130 may detect and correct errors in the data read from the memory device 200 during the read operation. The ECC unit 130 may not correct error bits when the number of the error bits is greater than or equal to a threshold number of correctable error bits, and may output an error correction fail signal indicating failure in correcting the error bits.

In some embodiments, the ECC unit 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), a Block coded modulation (BCM), and so on. The ECC unit 130 may include all circuits, systems or devices for the error correction operation.

The host interface 140 may communicate with the host device through one or more of various interface protocols such as a universal serial bus (USB), a multi-media card (MMC), a peripheral component interconnect express (PCI-E), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the memory controller 100 and the memory device 200 to allow the memory controller 100 to control the memory device 200 in response to a request from the host device. The memory interface 150 may generate control signals for the memory device 200 and process data under the control of the CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, a column decoder 260, and an input/output circuit 270. The memory cell array 210 may include a plurality of memory blocks 211 and may store data therein. The voltage generation circuit 230, the row decoder 240, the page buffer 250, the column decoder 260 and the input/output circuit 270 form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages having various levels. For example, in an erase operation, the voltage generation circuit 230 may generate operation voltages having various levels such as an erase voltage and a pass voltage.

The row decoder 240 may be connected to the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks among the plurality of memory blocks 211.

The page buffer 250 is connected to the memory cell array 210 through bit lines BL (not shown). The page buffer 250 may precharge the bit lines BL with a positive voltage, transmit/receive data to/from a selected memory block in program and read operations, or temporarily store transmitted data, in response to a page buffer control signal generated by the control circuit 220.

The column decoder 260 may transmit/receive data to/from the page buffer 250 or transmit/receive data to/from the input/output circuit 270.

The input/output circuit 270 may transmit, to the control circuit 220, a command and an address, transmitted from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

Figure 3:
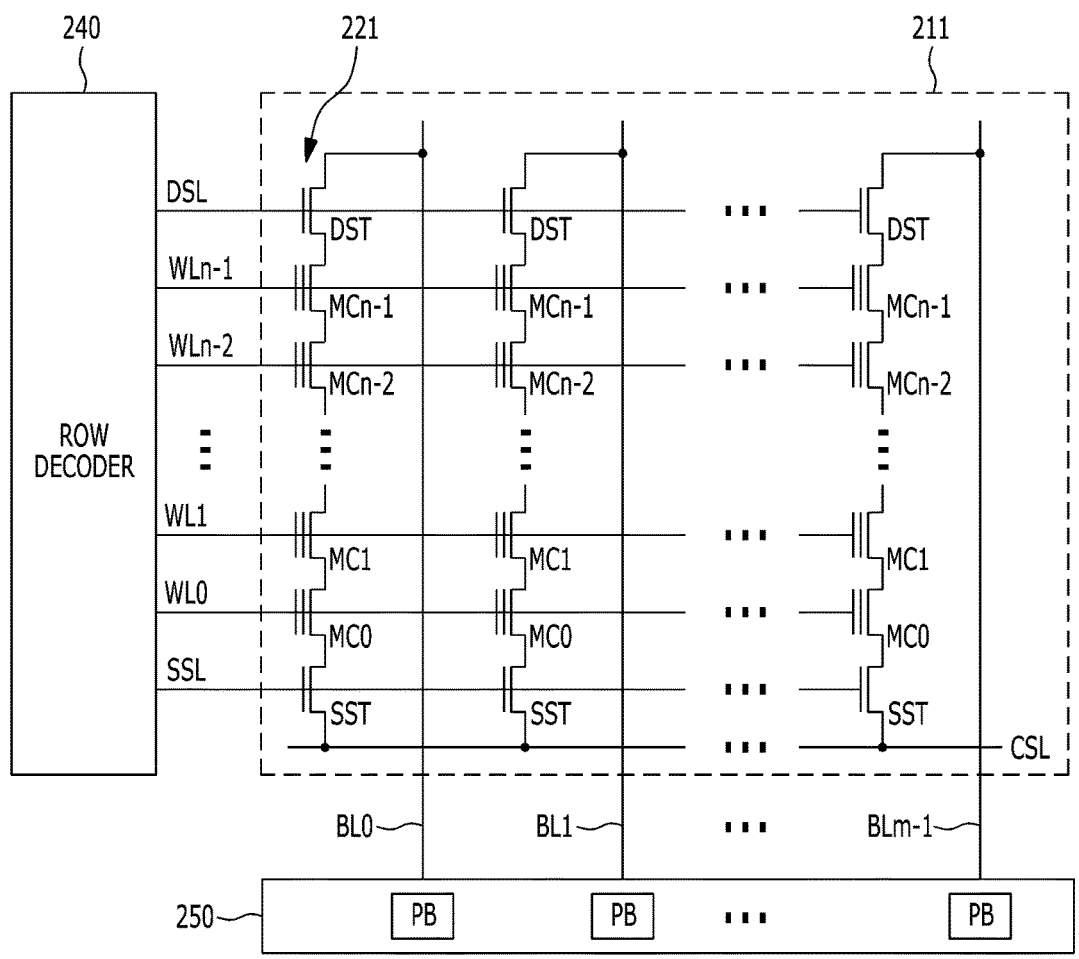
FIG. 3 is a circuit diagram illustrating a memory block of memory devices in accordance with an embodiment of the present invention.

FIG. 3 is a circuit diagram illustrating a memory block of a memory device in accordance with an embodiment of the present invention. For example, a memory block of FIG. 3 may be the memory blocks 211 of the memory device 200 shown in FIG. 2.

Referring to FIG. 3, the memory blocks 211 may include a plurality of cell strings 221 coupled to bit lines BL0 to BLm-1, respectively. The cell string of each column may include one or more drain selection transistors DST and one or more source selection transistors SST. A plurality of memory cells or memory cell transistors may be serially coupled between the selection transistors DST and SST. Each of the memory cells MC0 to MCn-1 may be formed of a multi-level cell (MLC) storing data information of multiple bits in each cell. The cell strings 221 may be electrically coupled to the corresponding bit lines BL0 to BLm-1, respectively.

In some embodiments, the memory blocks 211 may include a NAND-type flash memory cell. However, the memory blocks 211 are not limited to the NAND flash memory, but may include NOR-type flash memory, hybrid flash memory in which two or more types of memory cells are combined, and one-NAND flash memory in which a controller is embedded inside a memory chip.

Generally, power on boot of a memory system such as an SSD that only contains NAND flash memory as the primary programmable non-volatile memory requires information to be stored at specific locations within the NAND flash memory to identify where the firmware images, and its redundant copies, are located within the NAND flash memory. In order to meet reliability, this information has to be redundantly stored across different NAND flash devices or memories and hardware paths (or channels). This information may be referred to as the boot record.

Firmware updates cause the boot record to be modified. Since NAND flash memory has limitations on the number of program/erase (P/E) cycles, the boot records are written in a manner that minimizes the number of P/E cycles and forces the memory system to scan within a NAND flash blocks for the boot record. Boot records are stored in specific blocks within the NAND flash memory. As firmware updates occur, new NAND flash pages are written to the blocks. Therefore when the SSD drive boots, the exact NAND flash page within the block containing the last update is not known and must be searched.

Various embodiments of the present invention provides a scheme to use parallel processing to assist searching for NAND flash pages within the blocks to decrease the time to find the NAND flash page containing the latest boot record within a memory device such as the SSD.

Figure 4:
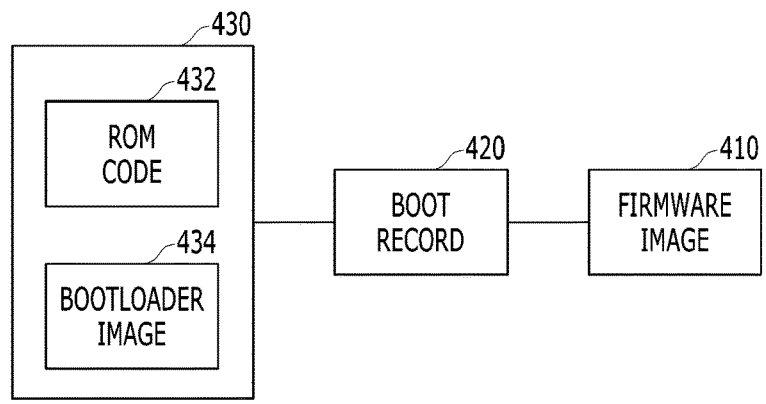
FIG. 4 is a diagram illustrating a scheme of searching the last updated boot record in a memory system in accordance with an embodiment of the present invention.

FIG. 4 is a diagram illustrating a scheme of searching the last updated boot record in a memory system in accordance with an embodiment of the present invention.

Referring to FIG. 4, the approach of the present invention assumes the ROM 430 contained within an application specific integrated circuit (ASIC) has a code to access a boot record 420 for a firmware image 410. The code of the ROM 430 can be separated into a smaller ROM code 432 and a bootloader image 434. The bootloader image 434 may be contained in the memory device such as the non-volatile NAND flash memory. The ROM code 432 has the ability to find and execute the bootloader image 434. The bootloader image 434 contains the code to access the boot record 420. In according to various embodiments of the present invention, the technique of utilizing parallel processing to find the bootloader 434 and its redundant copies can be applied. The bootloader 434 can use the mechanism to access the boot record 420. This later case is required when the code of the bootloader 434 is stored in NAND flash memory in a manner that does not allow many write cycles to gain higher data retention (i.e., firmware (FW) single-level cell (SLC) mode of NAND flash memory).

Figure 5:
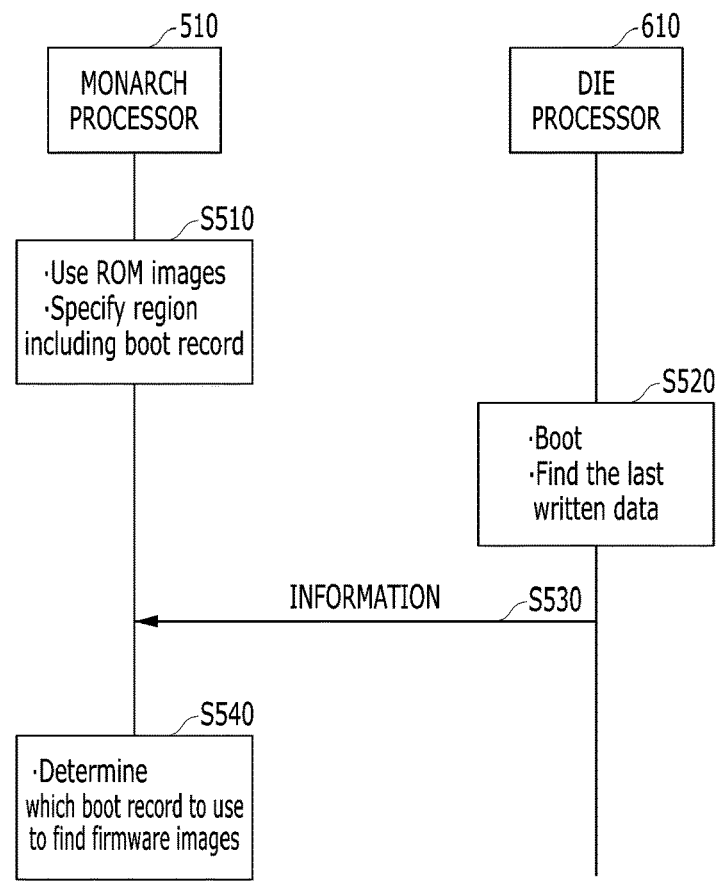
FIG. 5 is a diagram illustrating an operation of searching the last updated boot record between processors included in a memory system in accordance with an embodiment of the present invention.

FIG. 5 is a diagram illustrating an operation of searching the last updated boot record between processors included in a memory system in accordance with an embodiment of the present invention.

Referring to FIG. 5, the memory system may include a monarch processor 510 and a die processor 610. The monarch processor 510 may be included in a memory controller (e.g., 100 in FIG. 1) of the memory system (or the storage device). The die processor 610 may be included in a plurality of memory channels or devices (e.g., 200 in FIG. 1) of the memory system. Each of the plurality of memory channels may include a plurality of memory dies. Each of the plurality of memory dies may include a plurality of memory blocks.

On a power on boot of the memory system, the monarch processor 510 may use the ROM images and specify the memory dies and blocks containing boot records on each channel before allowing the die processor 610 on each channel to boot (S510). The boot of each die processor 610 on each channel may find the last written data within the blocks specified (S520). This information may be given to the monarch processor 510 (S530). The monarch processor 510 may determine which boot record to use to find the firmware images to load (S540).

Figure 6:
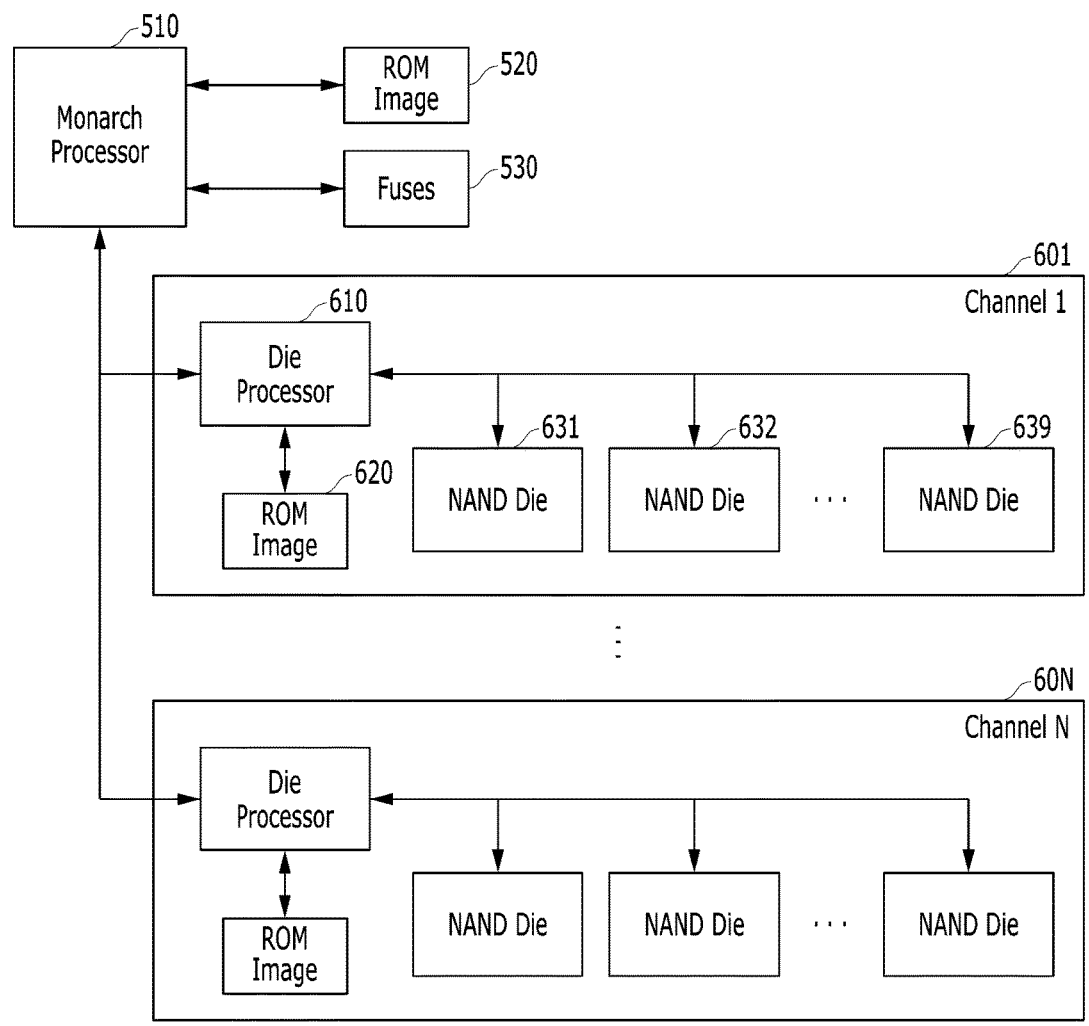
FIG. 6 is a diagram illustrating a memory system including parallel processors in accordance with an embodiment of the present invention.

FIG. 6 is a diagram illustrating a memory system including parallel processors in accordance with an embodiment of the present invention.

Referring to FIG. 6, the memory system may include a memory controller including a monarch processor 510 and a plurality of memory channels or devices 601-60N. The monarch processor 510 may be coupled to a plurality of memory channels, such as memory channels 601-60N. Each of the plurality of memory channels 601-60N may include a plurality of memory dies (e.g., NAND flash dies), such as memory dies 631-639. Each of the memory dies 631-639 may include a plurality of memory blocks. Each of the plurality of memory blocks may include a plurality of pages.

Die processors of the plurality of memory channels 601-60N may operate in parallel. The die processor 610 on each of the plurality of memory channels 601-60N may find the last written data within a predetermined block or blocks of the plurality of memory dies 631-639. The die processor 610 may provide information regarding the last written data to the monarch processor 510. The monarch processor 510 may determine which boot record to be used to identify firmware images based on the information regarding the last written data.

Each of the plurality of memory channels 601-60N may further include an element, such as a die ROM image 620 for a bootloader image or a read only memory (ROM) image including a code to access the last written data as the last boot record. The memory controller may further include an element, such as a ROM image 520 for a read only memory (ROM) image including a code to find and execute bootloader images for the monarch processor 510 or the plurality of memory channels 601-60N. Furthermore, the memory controller may include an element, such as fuses 530 for fusing, in which spare bits defines the plurality of memory channels and dies and the number of memory pages per boot record.

The embodiment of the present invention above is to parallelize accessing the boot record across different channels when the die processor 610 on each channel boots its own ROM image, such as the die ROM image 620. The embodiment may minimize serialization, save boot time, save power on the initial turn on, and free the monarch processor 510 of the memory controller to perform other initialization, like double data rate (DDR) training, synchronous dynamic random access memory (SDRAM) initialization, etc.

Typically data written to memory dies such NAND flash dies may be scrambled and depending on where the scrambling/descrambling in relation to the die processor 610 defines whether the die processor 610 can actually interpret the data read from the memory dies 631-639.

In the event that the die processor 610 on each of the memory channels 601-60N is unable to interpret data read from NAND flash pages, the die processor 610 must have the ability to determine if a NAND flash page is in an erased state. This is a lot like the initial bad-sector scan on a brand new drive, only reduced in scope by Apriori boot sector location information. Knowing that NAND flash pages are written in a specific order within a block, the die processor 610 reads pages from the specified die, such as the memory die 631 to 639, and blocks to find the last non-erase page during boot. The selection of which pages to read utilizes a binary search to find the boundary of pages written to erased pages. This information is provided to the monarch processor 510. The monarch processor 510 then reads the NAND flash pages descrambled and determines which boot record to be used to find the firmware images.

In the event that the die processor 610 on each of the memory channels 601-60N is able to interpret data read from NAND flash pages, during boot, the die processor 610 reads pages from the specified die, such as the memory die 631 to 639, and blocks to find the last boot record using a binary search to determine the pages to read. The boot record from each die block is provided to the monarch processor 510. The monarch processor 510 then selects a root record to be used to find the firmware images.

The identification of which memory channels and blocks contain boot records can either be hard coded in the ROM image 520 or available in other non-volatile devices in the memory controller. One mechanism is to use spare bits in the fuses 530 to define information including not only the memory channels and dies, but also the number of NAND flash pages per boot record. Utilizing a separate non-volatile device for this information allows for using different channels, blocks, and number of pages for the boot records to account for different NAND devices and drive capacities while using the same ROM image.

Figure 7:
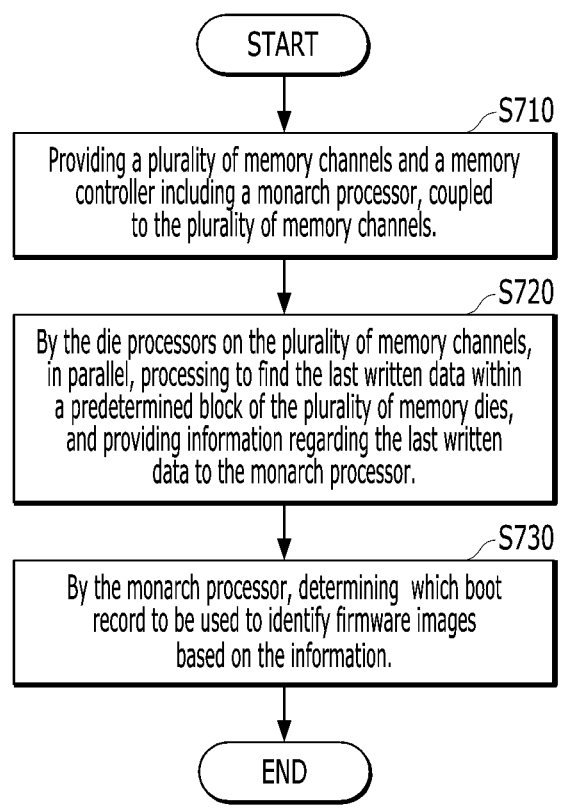
FIG. 7 is a flowchart illustrating an operation of searching the last updated boot record in a memory system in accordance with an embodiment of the present invention.

FIG. 7 is a flowchart illustrating an operation of searching the last updated boot record in a memory system in accordance with an embodiment of the present invention.

Referring to FIG. 7, the operation may include providing (S710) a plurality of memory channels 601-60N and a memory controller including a monarch processor 510, coupled to the plurality of memory channels 601-60N in FIG. 6. Each of the plurality of memory channels 601-60N may include a plurality of memory dies 631-639 and a die processor 610. Each of the plurality of memory dies 631-639 may include a plurality of memory blocks.

The operation may further include, by the die processors 610 on the plurality of memory channels 601-60N, in parallel, processing (S720) to find the last written data within a predetermined block or blocks of the plurality of memory dies 631-639, and providing information regarding the last written data to the monarch processor 510.

The operation may further include, by the monarch processor 510, determining (S730) which boot record to be used to identify firmware images based on the information regarding the last written data.

In an embodiment, the processing to find the last written data may include finding the last non-erase page as the last written data during boot, if the die processor 610 on each of the plurality of memory channels 601-60N is unable to interpret data read from the plurality of memory dies 631-639.

In another embodiment, the processing to find the last written data may include finding the last boot record as the last written data, if the die processor 610 on each of the plurality of memory channels 601-60N is able to interpret data read from the plurality of memory dies 631-639. Each of the plurality of memory channels 601-60N may include an element for a bootloader image including a code to access the last boot record. The memory controller may further include an element for a read only memory (ROM) image including a code to find and execute bootloader images for the plurality of memory channels 601-60N. The memory controller may further include an element for fuses, in which bits defines the plurality of memory channels 601-60N and dies and the number of memory pages per boot record.

As described above, the embodiment of the present invention may speed up boot time but utilizing parallel processing on each memory channel to assist with finding the boot record included within the channel.

While the invention has been described in conjunction with a specific best mode, it is to be understood that many alternatives, modifications, and variations will be apparent to those skilled in the art in light of a foregoing description. Accordingly, it is intended to embrace all such alternatives, modifications, and variations that fall within the scope of the included claims. All matters hitherto fore set forth herein or shown in the accompanying drawings are to be interpreted in an illustrative and non-limiting sense.

What is claimed is:

1. A memory system comprising:
   a plurality of memory channels, each of the plurality of memory channels includes a plurality of memory dies and a die processor, each of the plurality of memory dies includes a plurality of memory blocks; and
   a memory controller including a monarch processor, coupled to the plurality of memory channels,
   wherein the die processor on each of the plurality of memory channels is configured in parallel to:
   process to find last written data within at least a predetermined block of the plurality of memory dies; and
   provide information regarding the last written data to the monarch processor, the monarch processor determines which boot record to be used to identify firmware images based on the information.

2. The memory system of claim 1, wherein the die processor configured to find the last written data includes if the die processor on each of the plurality of memory channels is unable to interpret data read from the plurality of memory dies, the die processor finds a last non-erase page as the last written data during boot.

3. The memory system of claim 1, wherein the die processor configured to find the last written data includes if the die processor on each of the plurality of memory channels is able to interpret data read from the plurality of memory dies, the die processor finds the last boot record as the last written data.

4. The memory system of claim 3, wherein each of the plurality of memory channels further includes an element for a bootloader image including a code to access the last boot record.

5. The memory system of claim 4, further comprising an element for a read only memory (ROM) image including a code to find and execute bootloader images for the plurality of memory channels.

6. The memory system of claim 4, further comprising an element for fuses, in which bits defines the plurality of memory channels, dies, and number of memory pages per boot record.

7. A method for operating a memory system comprising:
   providing a plurality of memory channels and a memory controller including a monarch processor, coupled to the plurality of memory channels, each of the plurality of memory channels includes a plurality of memory dies and a die processor, each of the plurality of memory dies includes a plurality of memory blocks;
   by the die processors on the plurality of memory channels, in parallel, processing to find last written data within at least a predetermined block of the plurality of memory dies, and providing information regarding the last written data to the monarch processor; and
   by the monarch processor, determining which boot record to be used to identify firmware images based on the information.

8. The method of claim 7, wherein the processing to find the last written data comprises finding a last non-erase page as the last written data during boot, if the die processor on each of the plurality of memory channels is unable to interpret data read from the plurality of memory dies.

9. The method of claim 7, wherein the processing to find the last written data comprises finding a last boot record as the last written data, if the die processor on each of the plurality of memory channels is able to interpret data read from the plurality of memory dies.

10. The method of claim 9, wherein each of the plurality of memory channels further includes an element for a bootloader image including a code to access the last boot record.

11. The method of claim 10, wherein the memory controller further comprises an element for a read only memory (ROM) image including a code to find and execute bootloader images for the plurality of memory channels.

12. The method of claim 10, wherein the memory controller further comprises an element for fuses, in which bits defines the plurality of memory channels, dies, and numbers of memory pages per boot record.

13. A memory system comprising:
   a memory device including a plurality of memory dies and a die processor, each of the plurality of memory dies including a plurality of memory blocks; and
   a memory controller including a monarch processor, coupled to the memory device,
   wherein the die processor on each of the plurality of memory channels is configured in parallel to:
   process to find last written data within at least a predetermined block of the plurality of memory dies; and
   provide information regarding the last written data to the monarch processor, the monarch processor determines which boot record to be used to identify firmware images based on the information.

14. The memory system of claim 13, wherein the die processor configured to find the last written data includes if the die processor is unable to interpret data read from the plurality of memory dies, the die processor finds a last non-erase page as the last written data during boot.

15. The memory system of claim 13, wherein the die processor configured to find the last written data includes if the die processor is able to interpret data read from the plurality of memory dies, the die processor finds the last boot record as the last written data.

16. The memory system of claim 15, wherein the memory device further includes an element for a bootloader image including a code to access the last boot record.

17. The memory system of claim 16, further comprising an element for a read only memory (ROM) image including a code to find and execute bootloader images for the memory device.

18. The memory system of claim 16, further comprising an element for fuses, in which bits defines the plurality of memory channels, dies, and number of memory pages per boot record.

* * * * *